G. W. RAWSON.
FURNACES FOR DESICCATING ANIMAL OR OTHER MATTERS.
No. 176,351. Patented April 18, 1876.
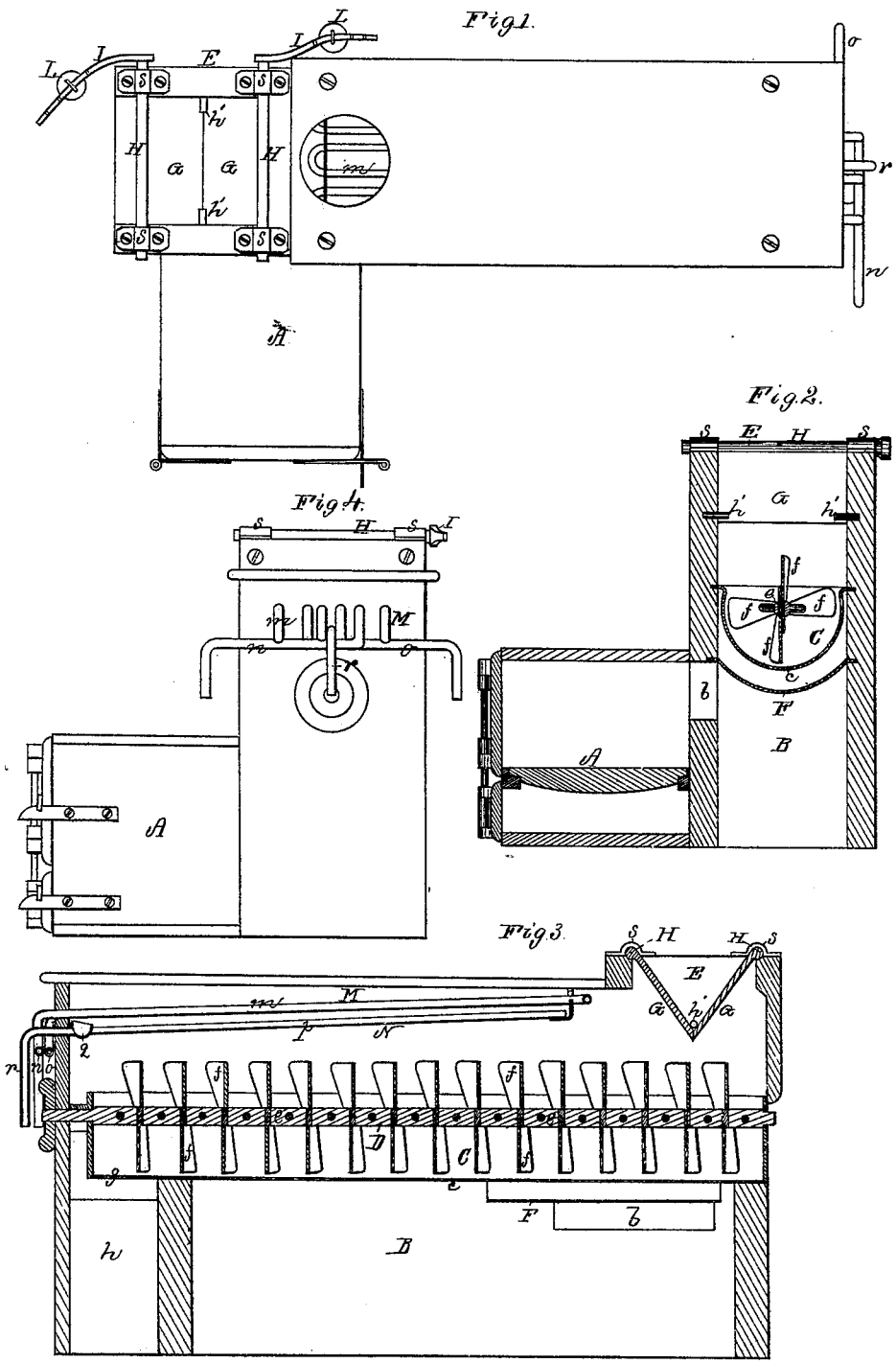

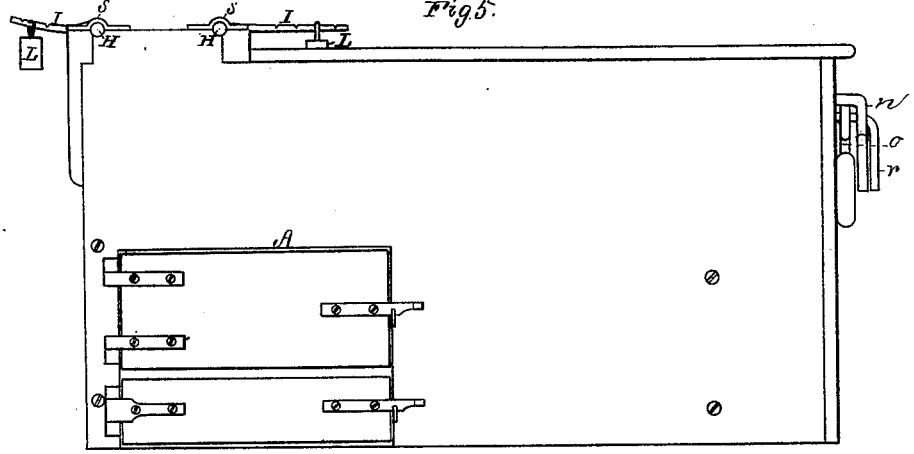

UNITED STATES PATENT OFFICE.

GEORGE W. RAWSON, OF CAMBRIDGEPORT, MASSACHUSETTS.

IMPROVEMENT IN FURNACES FOR DESICCATING ANIMAL OR OTHER MATTERS.

Specification forming part of Letters Patent No. 176,351, dated April 18, 1876; application filed September 9, 1875.

*To all whom it may concern:*

Be it known that I, GEORGE W. RAWSON, of Cambridgeport, of the county of Middlesex and State of Massachusetts, have invented a new and useful Furnace for Desiccating Animal or various other Matters; and do hereby declare the same to be fully described in the following specification and represented in the accompanying drawings, of which—

Figure 1 is a top view, Fig. 2 a transverse section, Fig. 3 a longitudinal section, Fig. 4 a rear-end elevation, Fig. 5 a front elevation, and Fig. 6 a horizontal section, of it, the plane of section of the latter figure being just above the condensing-pipes arranged in the drying-chamber.

In carrying out my invention, I combine with a furnace for drying ammoniacal matter, especially when it has in its drying-chamber a rotary agitator and propeller, a condenser and a water-intercepter, arranged in the drying-chamber of said furnace, all as hereinafter explained; and I also provide the furnace with one or more automatically-operating valves, arranged in and applied to the mouth or hopper of the drying-chamber, all being essentially as and for the objects or purposes as hereinafter explained.

In such drawings, A denotes a fire-place, whose throat $b$ leads directly into a long flue, B, arranged underneath the bottom $c$ of a drying-chamber, C, into which said flue is to open, as shown in Fig. 7, which is another vertical section of the furnace. The drying-chamber has its bottom in transverse section a semicircular arc, and there is within the chamber a rotary agitator and propeller, D, consisting of a shaft, $e$, and a series of wings or screw-blades, $f f$, projecting therefrom. Opening into the said chamber at or near one end is a hopper or receiving-mouth, E, and at the other end of the chamber there is a hole, $g$, for discharging matters from the chamber into a space, $h$. Directly in front of the throat of the fire-place, and arranged underneath the bottom $c$ of the drying-chamber, and with a concentric space between it and the said bottom is a metallic plate or guard, F, whose office is to protect the bottom of the chamber from the direct heat or flame of the fire, in order that such bottom may not become heated, so as to set fire to or burn any ammoniacal matter when resting upon or passing along it. The hopper or mouth E has within it two inclined valves, G G, arranged as shown, and projecting from shafts H H, extending across the top of the mouth E, and arranged in boxes $s\ s\ s\ s$ applied thereto. From each of the said shafts an arm, I, extends, and is furnished with a weight, L, to overbalance the valve, which, when closed, rests against its fellow or studs $h'\ h'$, extending inward from the sides of the mouth, the whole constituting a self or automatically closing hopper.

On fish or ammoniacal matter being thrown into the hopper, and upon either or both its valves, each valve or valves will give way and allow the matter to fall into the drying-chamber, after which the valve or valves will close or be closed automatically.

Within the upper part of the drying-chamber there is a condenser, M, and a water intercepter and discharger, N. The object of the condenser is to condense the steam or vapor arising from the ammoniacal or other matter that may be in the process of being heated and moved along in the drying-chamber. Such steam or vapor, condensing upon the condenser, will drop therefrom into the gutters of the intercepter, and, running through such and into the receiver, will be discharged therefrom by an educt. The condenser M is composed of a series of pipes, $m$, each of which is bent at its middle, so as to bring its two halves into parallelism, the pipes so bent being disposed parallel to each other in a slightly-inclined plane. One leg of each pipe leads out of an induct, $n$, and the other into an educt, $o$, all being arranged as shown. The intercepter N consists of a series of gutters, $p$, placed underneath the pipes $m$, and to open into a transverse receiver or trough, $q$, provided with an educt, $r$.

While the furnace may be in operation cold water is to be caused to flow through and out of the pipes of the condenser, which, by being kept cool, will condense the steam or hot vapors in the drying-chamber. The water of condensation, falling from the pipes into the gutters $p$, will be discharged by them into the receiver $q$, from which it will escape by the pipe $r$.

I do not claim, in combination with a drying-chamber in which heated air only is used for drying lumber, &c., a condenser and a spout or water-intercepter, all being as shown in the United States Patent No. 154,205. My invention has reference to drying-chambers and furnaces which are so connected that, when in operation, the smoke and gaseous products of combustion escaping from the fuel in the furnace or fire-place pass from thence, and are conducted into and so as to pass through the drying-chamber, in order that they may not only desiccate, but smoke or cure the fish or ammoniacal matter in said chamber. In such a combination of a condenser and a water-intercepter, as described, with such a furnace and drying-chamber, with or without its agitator and propeller, as hereinbefore referred to, the condenser and water-intercepter (wood being used as fuel in the furnace) are productive of new results or effects—viz., the condensation of the tarry matter and pyroligneous or other acid of the smoke and volatile products of combustion, as well as more or less of the oil escaping from the fish or ammoniacal matters, with the vapor discharged therefrom, thereby not only preventing such acid and tarry matters from gathering on the walls and roof of the drying-chamber and caking the carbon or soot thereon, but the pyroligenous acid from oxidating or injuring the inner surface of the drying-chamber. The agitator and propeller, when used in the chamber with the condenser and water-intercepter, not only stirs up or agitates and moves along the ammoniacal matter, but facilitates the discharge of the oily vapors, the condenser operating to intercept their oil and prevent its loss, as set forth.

I claim—

1. The combination of a condenser, M, and water intercepter N, substantially as described, with a drying-chamber, C, and a furnace or fire-place, A, all being arranged and to operate essentially as and for the purpose specified.

2. The combination of a condenser, M, water-intercepter N, and an agitator and propeller, D, all substantially as described, with a drying-chamber, C, and a furnace or fire-place, A, all being applied essentially and to operate as and for the purpose specified.

3. A drying-furnace having the hopper or receiving-mouth of its drying-chamber provided with one or more valves, G, applied thereto, and to operate automatically, as specified.

GEO. W. RAWSON.

Witnesses:
R. H. EDDY,
J. R. SNOW.